No. 769,381. PATENTED SEPT. 6, 1904.
F. B. HINKSON.
FILTER.
APPLICATION FILED FEB. 9, 1904.
NO MODEL.
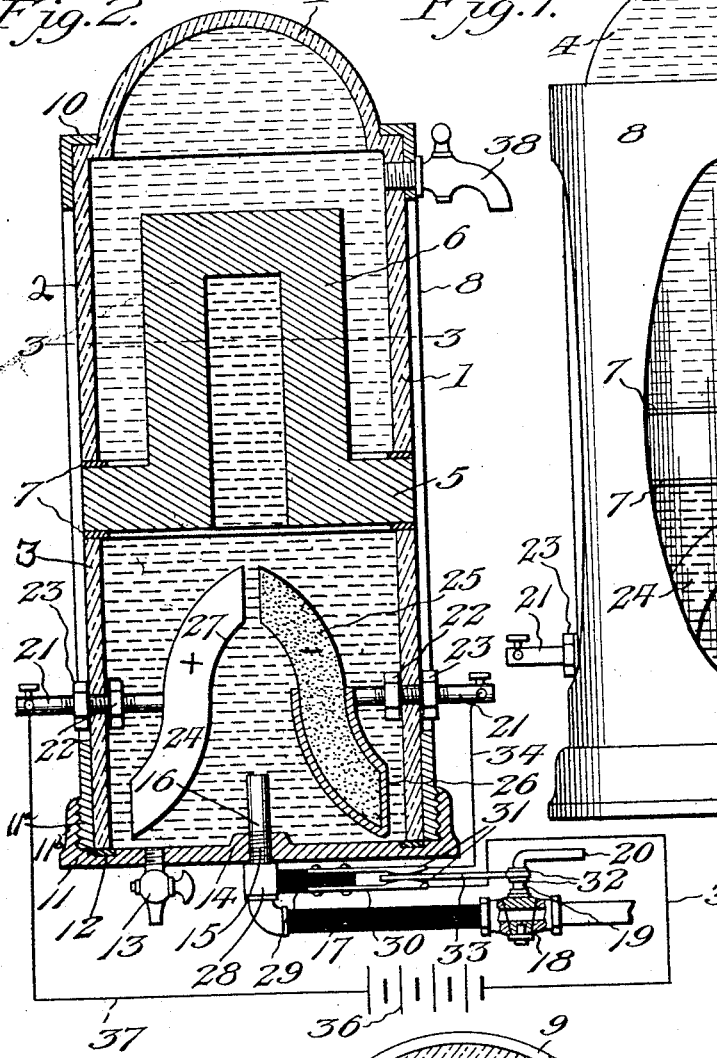
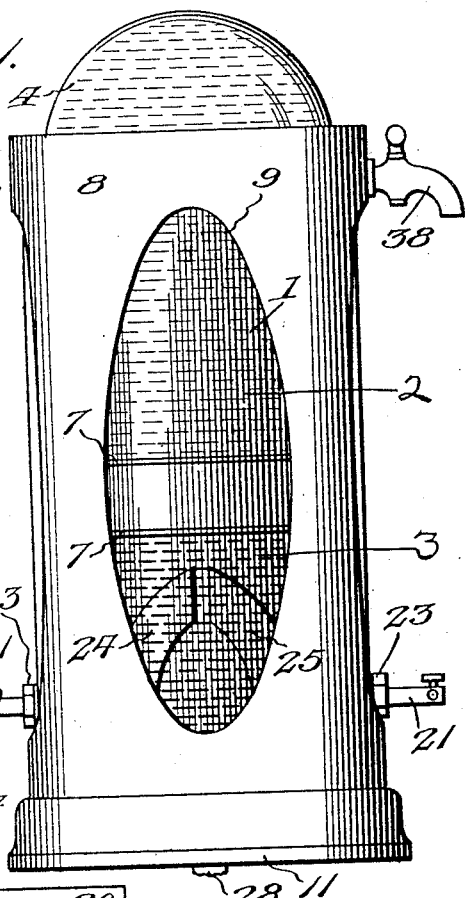
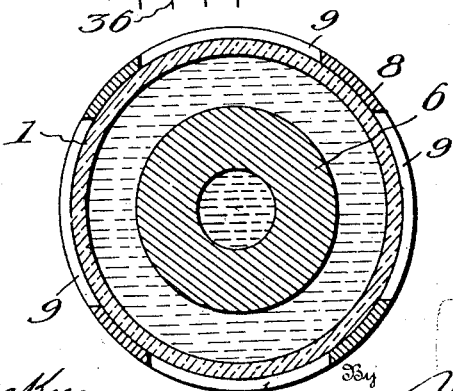
Witnesses
Edwin F. McKee
Chas. S. Hoyer
Inventor
Frank B. Hinkson
By Victor J. Evans
Attorney

No. 769,381.
Patented September 6, 1904.

UNITED STATES PATENT OFFICE.

FRANK B. HINKSON, OF NEWCASTLE, PENNSYLVANIA, ASSIGNOR, BY MESNE ASSIGNMENTS, TO S. P. EMERY, ROBERT H. WHALEY, AND JOSEPH S. LONG, OF NEWCASTLE, PENNSYLVANIA.

FILTER.

SPECIFICATION forming part of Letters Patent No. 769,381, dated September 6, 1904.

Application filed February 9, 1904. Serial No. 192,839. (No model.)

*To all whom it may concern:*

Be it known that I, FRANK B. HINKSON, a citizen of the United States, residing at Newcastle, in the county of Lawrence and State of Pennsylvania, have invented new and useful Improvements in Filters, of which the following is a specification.

This invention relates to a filter embodying, in addition to a filtering element, an electrical means.

The improved filter is adapted for purifying liquids generally, including water and milk, and the electrical means are so arranged therein that the inflowing liquid will first be brought into contact with and influenced thereby before final purification or clarification by the filtering element. The electrical means or attachment as a whole is so arranged that the electrodes thereof located within the body of the filter will be automatically energized simultaneously with the opening of a valve controlling an inflow-pipe connecting with the filter.

The primary object of the invention is to utilize electricity within a filter to destroy bacteria and other minute life present in certain liquids previous to a final purification by a filtering element by having the liquid treated first brought into engagement with strongly-energized electrodes of a positive and negative character in opposition to each other, the electrodes acting on the fluid surrounding the same as long as the feeding of the filter ensues.

The invention consists in the construction and arrangement of parts to be more fully hereinafter set forth.

In the drawings, Figure 1 is a side elevation of a filter embodying the features of the invention and showing only a part of the electrical attachments and feed or supply means therefor. Fig. 2 is a transverse vertical section through the filter, showing the electrical attachments complete and the feed or supply pipe partially in section. Fig. 3 is a horizontal section on the line 3 3, Fig. 2.

Similar numerals of reference are employed to indicate corresponding parts in the several views.

The filter comprises an inclosing cylinder 1, of glass or other transparent material, having upper and lower sections 2 and 3, the upper section being provided with a dome 4 to increase its capacity. The lower end of the section 2 and both the upper and lower ends of the section 3 are fully open, and between the lower end of the section 2 and the upper end of the section 3 the lower circular base member or flange 5 of an angular, arched, or inverted-U-shaped filtering element 6 is interposed, packing-rings or gaskets 7 being arranged between the ends of the sections 2 and 3 and the base member or flange 5 to institute a water-tight joint. The angular, arched, or inverted-U-shaped filtering element 6 is of materially less diameter than the portion of the section 2 in which it is located to provide ample space for the filtered liquid, and by allowing the liquid to flow upwardly into the filtering element by reason of its arched contour a materially greater filtering-surface is presented for engagement by the liquid to facilitate the filtering operation without in the least detracting from the effectiveness of such operation. The material used in forming the filtering element 6 is preferably clay having beneficial filtering characteristics, and the walls of said element are comparatively thin. The outer periphery of the flange 5 is made impervious to prevent the water from exuding therefrom by coating it with porcelain or other suitable material.

The inclosing cylinder 1 is surrounded by a metallic casing or shell 8, having elongated elliptical sight-openings 9 formed therein to permit inspection of the interior of the filter. The casing or shell 8 has an upper annular flange 10 engaging the cylinder 1 at the base of the dome 4, and secured to the lower end of the casing or shell is a base-cap 11, of metal, having a gasket or packing 12 seated therein for engagement with the lower end of the section 3 of the cylinder. The lower end of the cylinder is screw-threaded, as shown at $11^a$, and a base-cap is provided with a vertical flange $11^b$, having interior screw-threads to permit the base-cap to be removably secured to the cylinder. It is apparent that the base-cap not only forms a bottom for the lower section, but that it also retains the sections 2 3, the filtering element, and the cylinder in relative position. It is also apparent that by the removal of the base-cap the filter may be easily taken apart for the purpose of cleaning and repairing the same. At one side of the center of the base-cap 11 a drain-cock 13 communicates with the interior of the lower part of the filter to facilitate the removal of sediment or other impurities that may settle on the said cap, and at the center the cap has an enlargement or boss 14, with a screw-threaded opening 15 extending centrally therethrough to receive the vertical extremity 16 of an inflow or feed pipe 17, the said extremity 16 projecting upwardly into the section 3 a distance above the base-cap 11 to render the introduction of the liquid to be purified and filtered effective. The inflow or feed pipe 17 has a plug-valve 18 arranged therein and provided with an upwardly-projecting stem 19, terminating in an angular handle or grip 20.

At diametrically opposite points metallic connections or stems 21 project inwardly through the section 3 and are horizontally disposed, said connections or stems being screw-threaded at intermediate points to receive inner and outer securing-nuts 22 and 23, which bear firmly against the inner and outer surfaces of the said section, the openings in the latter through which the connections or stems project being screw-threaded to form tight joints, and, if found desirable, any suitable packings may be interposed between the inner nuts 22 around the connections or stems and the inner side of the section 3. The inner ends of the connections or stems 21 are firmly secured to the intermediate portions of the outer edges of electrodes 24 and 25, the electrode 24 being preferably formed of an alloy made up of nickel and aluminium, and the electrode 25 is of carbon. The electrode 24 is positive and the electrode 25 negative, as will be readily understood, the latter electrode being held by a depending socket 26, constructed of suitable metal. Both electrodes are of compound curved contour and have their lower extremities flaring outwardly and their upper ends in close relation to provide an arched receiving-space between them. The liquid fed into the filter strikes the upper concave edge portions 27 of the electrodes and is deflected downwardly and outwardly to cause a portion of the sediment or impurities carried thereby, as well as devitalized bacteria or other minute life, to be precipitated against the base-cap 11 near the lower extremity of the section 3 and away from the point of entrance of the liquid into the filter as far as practicable. By having the upper ends of the electrodes in contiguity a great benefit is derived in the treatment of the inflowing liquid with respect to the destruction or devitalization of bacteria or other minute life. The electrodes 23 and 27 will extend far enough across the receptacle to render the devitalization of the bacteria or other minute life effective, the thickness or extent of the said electrodes in a plane at right angles to the position thereof (shown by Fig. 1) being governed entirely by the strength of the current and electrical influence demanded within the receptacle below the filtering means in accordance with the treatment of different liquids and also in proportion to the capacity of the receptacle. The electrodes are centrally located with respect to the part of the receptacle in which they are disposed, so that the electrolysis will be more effective. It will be also understood that all the liquid contained in the lower section 3, as well as that in the filtering element 6, will be under strong electrical influence, and such other matter or deleterious substance that may be present in the liquid and can be controlled by electricity from a purifying standpoint will be thrown down or be caused to precipitate by gravitation to the base-cap 11. A sleeve or collar 28 is secured rigidly on the inflow or feed pipe 17 close to the under side of the base-cap 11 and has an arm 29, to the upper and lower sides of which resilient shanks 30 of closely-arranged contacts 31 are secured. The sleeve or collar 28 and its arm 29 are composed of a non-conducting material, and the contacts 31 are of conducting material, as will be readily understood. An insulating or non-conducting sleeve 32 is secured on the stem 19 of the valve 18, and rigidly attached to said sleeve is an elongated switch projection or circuit-making member 33, which is movable with the valve-stem 19 and disposed in such plane as to pass between the contacts 31. When the valve 18 is closed, the circuit making or closing projection 33 is thrown outwardly and away from the contacts 31; but when said valve is opened the projection 33 is forced in between the contacts. The outer extremities of the connections or stems 21 are arranged similar to ordinary binding-posts, and connected to one of these stems is a wire 34, attached to the upper contact 31. From the lower contact 31 a wire 35 runs to the negative pole of a battery 36, and from the positive pole of said battery a wire 37 connects with the opposite stem 21.

From the foregoing it will be seen that water, milk, or other liquids may be purified and rendered wholesome by destroying the bacteria or minute life primarily resident therein previous to the filtering operation of the element 6. The liquid is permitted to flow into the filter until the capacity of the section 2 is exhausted or until said section becomes completely filled with the filtered liquid. The filtered liquid can be drawn from the section 2 through the medium of an upper cock or faucet 38, and it will be obvious that to render the filter effective in its operation the source of supply of the liquid to be filtered should be above the upper end of the filter under certain conditions. Water, however, under pressure coming through the pipe 17 will practically reach the upper section in filtered condition, as will be readily understood.

The parts of the filter may be readily separated and cleaned at any time desired, and when found necessary the filtering element 6, as well as the electrodes, may be replaced by other like devices. It will also be understood that changes in the proportions, dimensions, and minor details of the several parts may be resorted to without departing from the spirit of the invention.

Having thus fully described the invention, what is claimed as new is—

1. A filter having upper and lower sections, a filtering element interposed between said sections and provided with an upwardly-extending arch of less diameter than the inner diameter of the upper section and also with a flange at the lower terminal thereof to provide a filtering-partition located at the upper terminal of the lower section, the arch of the filtering element being located wholly in the upper section, and electrodes disposed in the lower section over the inlet means, the liquid flowing into the lower section being held in operative adjacency to the electrodes by the filtering element mainly located in the upper section.

2. A filter having a filtering element disposed therein and of inverted-U-shaped contour, the element being provided with a lower flange also of filtering material and which divides the filter into upper and lower chambers, the lower chamber having a bottom inlet, and electrodes arranged above the inlet in opposite positions and having their upper terminals nearer to each other than the lower terminals thereof.

3. A filter having electrodes in the lower portion thereof, said electrodes being formed with depending outwardly-projecting lower extremities and having their upper ends in close relation to each other, the filtering element arranged above the upper end of the said electrodes, and means for feeding the liquid to be filtered into the lower portion of the filter between the electrodes.

4. A filter having upright oppositely-disposed adjustable electrodes therein, a valved feed-pipe passing through the bottom of the filter and arranged to direct the liquid to be filtered between the electrodes, and means for energizing the said electrodes simultaneously with the opening movement of the valve of the feed-pipe, the said electrodes remaining energized during the liquid-feeding operation.

5. A filter having upright adjustable electrodes in the lower portion thereof, a feed-pipe projecting through the bottom of the filter between the lower extremities of the electrodes and arranged to direct the liquid to be filtered against the inner portions of the electrodes, a valve in the feed-pipe, an electrical circuit in which the electrodes are included, and means controlled by the said valve and including a part of the circuit to close the latter when the valve is open.

6. A filter having upright adjustable electrodes therein and relatively arranged to form a downwardly-flaring arch, the upper ends of the electrodes being in close relation to each other, means for energizing the electrodes, and a liquid-feed pipe entering the bottom of the filter centrally with relation to the space between the electrodes, whereby the liquid will be fed upwardly between the latter.

7. A filter having upright adjustable electrodes therein with a downwardly-flaring arched space between them, the upper ends of the electrodes being in close relation, a filtering device above the upper ends of the electrodes, means for energizing the electrodes, and a feed-pipe entering the bottom of the filter centrally with relation to the space between the electrodes.

8. A filter having upper and lower chambers, an arched filtering device separating the chambers, upright adjustable electrodes in the lower chamber and provided with a downwardly-flaring arched space between them, the upper ends of the electrodes being in close relation to each other, means for energizing the electrodes, and a liquid-feed pipe entering the bottom of the filter centrally with relation to the space between the electrodes.

9. A filter comprising upper and lower sections, the former having its upper end closed and its lower end open, and the latter having both of its ends open, a filtering element arranged between the sections, a casing surrounding the sections, a base-cap secured to the casing to form a bottom for the lower section and to secure the casing in applied position and retain the sections and filtering element in relative position, and electrodes arranged in one of the sections.

10. In a filter, a casing divided into compartments, a water-inlet device projecting into the lowermost of said compartments, a water-supply pipe communicating with said device, electrodes located in said lowermost compartment and arranged at diametrically opposite points with respect to the inlet device whereby all the water entering through the latter will be subjected to electrolytic action before leaving said compartment, a filtering material interposed between and separating the compartments and forming the sole means of passage of the water from the lowermost to the uppermost compartment, and means whereby the water can be discharged from the filter after it has passed through the filtering material.

11. In a filter, a casing divided into compartments, filtering material arranged intermediate and forming the separating means for the compartment, an inlet-pipe communicating with the lower compartment and having a valve, a nipple attached to the inlet-pipe and projecting upwardly into the lower compartment, a pair of electrodes disposed in relation to the opposite portions of the nipple whereby all the water entering through said nipple will be permitted to flow upwardly unobstructedly and be subjected to electrolytic action before leaving the lower compartment, a circuit-breaker operative simultaneously with the valve of the inlet-pipe, and a circuit in which said electrodes and circuit-breaker are included.

12. A filter comprising upper and lower sections, the former having its upper end closed and dome-shaped, and its other end open, and the latter having both of its ends open, a filtering element arranged between the sections, a casing having its upper end provided with a flange engaging the upper section, and its lower end screw-threaded, a base-cap having a screw-threaded flange and removably secured to the cylinder to form a bottom for the lower section and to secure the casing in applied position and retain the sections and filtering element in relative position, and electrodes arranged in the lower section.

13. A filter comprising sections, a filtering element arranged between the sections, a casing surrounding the sections, a base-cap secured to the cylinder to form a bottom for the lower section, and to secure the casing in applied position and retain the filtering element and sections in relative position, and electrodes arranged in one of the sections.

14. A filter comprising sections, a filtering element arranged between the sections, a casing surrounding the sections, a base-cap secured to the cylinder to form a bottom for the lower sections, and to secure the casing in applied position and retain the filtering element and casing in relative position, electrodes arranged in one of the sections, a feed-pipe, a valve arranged in the feed-pipe, a contact carried by the feed-pipe, and a circuit-making member carried by the stem of the valve.

In testimony whereof I affix my signature in presence of two witnesses.

FRANK B. HINKSON.

Witnesses:
JOHN L. FLETCHER,
CHAS. S. HYER.